United States Patent
Wang et al.

(10) Patent No.: US 11,454,974 B2
(45) Date of Patent: Sep. 27, 2022

(54) METHOD, APPARATUS, DEVICE, AND STORAGE MEDIUM FOR CONTROLLING GUIDE ROBOT

(71) Applicant: Baidu USA LLC, Sunnyvale, CA (US)

(72) Inventors: Liyang Wang, Sunnyvale, CA (US); Jinxin Zhao, Sunnyvale, CA (US); Liangjun Zhang, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 171 days.

(21) Appl. No.: 16/915,533

(22) Filed: Jun. 29, 2020

(65) Prior Publication Data
US 2021/0402601 A1     Dec. 30, 2021

(51) Int. Cl.
*G05D 1/02* (2020.01)
*A61H 3/06* (2006.01)
*B25J 9/16* (2006.01)

(52) U.S. Cl.
CPC ......... *G05D 1/0214* (2013.01); *G05D 1/0274* (2013.01); *A61H 3/061* (2013.01); *B25J 9/1666* (2013.01); *G05D 2201/0206* (2013.01)

(58) Field of Classification Search
CPC ................ G06V 20/58; H04W 4/024; G05D 2201/0206; G05D 1/0214; G05D 1/0274; G01S 17/93; B25J 9/1666; B25J 11/008; G06K 9/00805; G06Q 50/10
See application file for complete search history.

(56) References Cited

U.S. PATENT DOCUMENTS

| 9,902,069 | B2 * | 2/2018 | Farlow | B25J 11/009 |
| 11,016,491 | B1 * | 5/2021 | Millard | G05D 1/0274 |
| 2009/0031823 | A1 * | 2/2009 | Doh | A63H 11/00 73/862.391 |
| 2013/0317944 | A1 * | 11/2013 | Huang | H04W 4/02 455/457 |

(Continued)

FOREIGN PATENT DOCUMENTS

| CN | 107390703 A | * | 11/2017 | ............. A61H 3/061 |
| WO | WO-2012102506 A2 | * | 8/2012 | ............. A61H 3/061 |

OTHER PUBLICATIONS

Schoels, T., Palmieri, L., Arras, K., Diehl, M., An NMPC Approach using Convex Inner Approximations for Online Motion Planning with Guaranteed Collision Avoidance, Sep. 18, 2019, arXiv (Year: 2019).*

*Primary Examiner* — Abby Y Lin
*Assistant Examiner* — Karston G. Evans
(74) *Attorney, Agent, or Firm* — Seed IP Law Group LLP (57) ABSTRACT

Embodiments of the present disclosure disclose a method, apparatus, device, and storage medium for controlling a guide robot, and relate to the field of artificial intelligence, robots, and multi-sensor fusion technologies. A specific embodiment of the method includes: acquiring a state of the guide robot, a state of a user, and a position of an obstacle; generating a state update equation for a combined system of the guide robot and the user based on the state of the guide robot and the state of the user; generating a collision-free global path based on the position of the obstacle; generating a control command based on the state update equation for the combined system and the collision-free global path; and driving the guide robot to move based on the control command.

18 Claims, 7 Drawing Sheets

(56) References Cited

U.S. PATENT DOCUMENTS

| | | | |
|---|---|---|---|
| 2014/0257569 A1* | 9/2014 | Yip | G05B 15/02 |
| | | | 700/275 |
| 2014/0350839 A1* | 11/2014 | Pack | G05D 1/0251 |
| | | | 901/1 |
| 2016/0077526 A1* | 3/2016 | Sisbot | G06Q 50/01 |
| | | | 901/1 |
| 2017/0277197 A1* | 9/2017 | Liao | G06T 7/55 |
| 2019/0210224 A1* | 7/2019 | Zanchettin | B25J 9/1664 |
| 2019/0282433 A1* | 9/2019 | Higgins | A61H 3/06 |
| 2020/0202107 A1* | 6/2020 | Ozkucur | G05D 1/0274 |
| 2021/0294347 A1* | 9/2021 | Chen | G05D 1/0255 |

* cited by examiner

METHOD, APPARATUS, DEVICE, AND STORAGE MEDIUM FOR CONTROLLING GUIDE ROBOT

TECHNICAL FIELD

Embodiments of the present disclosure relate to the field of computer technologies, specifically to the field of artificial intelligence, robots, and multi-sensor fusion technologies, and more specifically to a method, apparatus, device, and storage medium for controlling a guide robot.

BACKGROUND

Guide dogs can guide vision-impaired persons to reach their destinations while avoiding obstacles, thus greatly improving the quality of their daily life. However, the popularity rate of guide dogs in China is seriously insufficient. The main reason is that the training of the guide dogs is time-consuming and expensive with a low percent of pass. Modern navigation-assisted technology has great potentials in terms of helping vision-impaired persons and improving their life quality. Many researchers have studied potential solutions. The technology is generally divided into a wearable device, an intelligent cane, and a robotic guide dog.

For the robotic guide dog, existing technologies usually assume that a vision-impaired person will completely follow the robotic guide dog, and coincide with a path taken by the robotic guide dog. Therefore, the existing technologies mainly focus on the perception, planning and control of the robotic guide dog itself.

SUMMARY

Embodiments of the present disclosure present a method, apparatus, device, and storage medium for controlling a guide robot.

In a first aspect, an embodiment of the present disclosure presents a method for controlling a guide robot, including: acquiring a state of the guide robot, a state of a user, and a position of an obstacle, the guide robot and the user being connected with a rigid object; generating a state update equation for a combined system of the guide robot and the user based on the state of the guide robot and the state of the user; generating a collision-free global path based on the position of the obstacle; generating a control command based on the state update equation for the combined system and the collision-free global path; and driving the guide robot to move based on the control command.

In a second aspect, an embodiment of the present disclosure presents an apparatus for controlling a guide robot, including: an information acquiring module configured to acquire a state of the guide robot, a state of a user, and a position of an obstacle, the guide robot and the user being connected with a rigid object; an equation generating module configured to generate a state update equation for a combined system of the guide robot and the user based on the state of the guide robot and the state of the user; a path generating module configured to generate a collision-free global path based on the position of the obstacle; a command generating module configured to generate a control command based on the state update equation for the combined system and the collision-free global path; and a movement driving module configured to drive the guide robot to move based on the control command.

In a third aspect, an embodiment of the present disclosure presents an electronic device, including: at least one processor; and a memory communicatively connected to the at least one processor; where the memory stores instructions that can be executed by the at least one processor, and the instructions are executed by the at least one processor, such that the at least one processor can execute the method according to any one implementation in the first aspect.

In a fourth aspect, an embodiment of the present disclosure presents a non-transient computer-readable storage medium storing computer instructions, where the computer instructions are used for causing a computer to execute the method according to any one implementation in the first aspect.

In a fifth aspect, an embodiment of the present disclosure provides another server, including: an interface; a memory storing one or more programs thereon; and one or more processors operably connected to the interface and the memory for: acquiring a state of a guide robot, a state of a user, and a position of an obstacle, the guide robot and the user being connected with a rigid object; generating a state update equation for a combined system of the guide robot and the user based on the state of the guide robot and the state of the user; generating a collision-free global path based on the position of the obstacle; generating a control command based on the state update equation for the combined system and the collision-free global path; and driving the guide robot to move based on the control command.

In a sixth aspect, an embodiment of the present disclosure provides a computer-readable storage medium storing a computer program thereon, where the computer program, when executed by one or more processors, causes the one or more processors to: acquire a state of a guide robot, a state of a user, and a position of an obstacle, the guide robot and the user being connected with a rigid object; generate a state update equation for a combined system of the guide robot and the user based on the state of the guide robot and the state of the user; generate a collision-free global path based on the position of the obstacle; generate a control command based on the state update equation for the combined system and the collision-free global path; and drive the guide robot to move based on the control command.

It should be understood that contents described in the SUMMARY are neither intended to limit key or important features of embodiments of the present disclosure, nor intended to limit the scope of the present disclosure. Other features of the present disclosure will become readily understood in conjunction with the following description.

BRIEF DESCRIPTION OF THE DRAWINGS

By reading detailed descriptions of non-limiting embodiments with reference to the following accompanying drawings, other features, objectives and advantages of the present disclosure will become more apparent. The accompanying drawings are used for better understanding of the present solution, and do not impose a limitation on the present disclosure. In the figures.

DETAILED DESCRIPTION OF EMBODIMENTS

Example embodiments of the present disclosure are described below with reference to the accompanying drawings, including various details of the embodiments of the present disclosure to contribute to understanding, which should be considered merely as examples. Therefore, those of ordinary skills in the art should realize that various alterations and modifications can be made to the embodiments described here without departing from the scope and spirit of the present disclosure. Similarly, for clearness and conciseness, descriptions of well-known functions and structures are omitted in the following description.

It should be noted that the embodiments in the present disclosure and the features in the embodiments may be combined with each other on a non-conflict basis. The present disclosure will be described in detail below with reference to the accompanying drawings and in combination with the embodiments.

Figure 1:
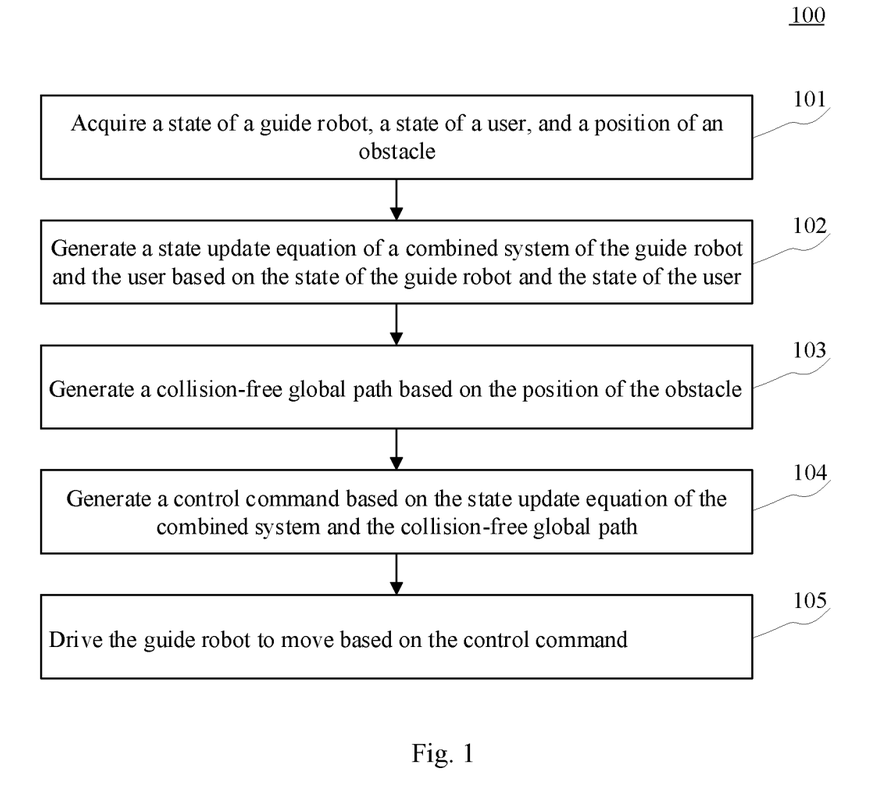
FIG. 1 is a flowchart of a method for controlling a guide robot according to an embodiment of the present disclosure.

FIG. 1 is a process 100 of a method for controlling a guide robot according to an embodiment of the present disclosure. The method for controlling a guide robot includes the following steps:

Step 101: acquiring a state of a guide robot, a state of a user, and a position of an obstacle.

In the present embodiment, sensors may be mounted on the guide robot for acquiring the state of the guide robot, the state of the user, and the position of the obstacle.

Generally, the user may be a vision-impaired person, such as a blind person. The guide robot may be a robotic guide dog. The guide robot and the user are connected with a rigid object, such that the user keeps approximately the same distance to the guide robot as the rigid object length. The rigid object is usually strip-shaped, including but not limited to a rigid rod, a rigid rope, and the like. Thus, the user need not take extra sensors, and only uses the sensors mounted on the robot for determining the user position.

The sensors mounted on the guide robot may include, but are not limited to, IMU (Inertial measurement unit), Lidar (Light Detection and Ranging), and wheel odometry. The state of the guide robot may include a position and a heading angle of the guide robot. The state of the user may include a position of the user.

Step 102: generating a state update equation for a combined system of the guide robot and the user based on the state of the guide robot and the state of the user.

In the present embodiment, the state update equation for the combined system of the guide robot and the user can be generated based on the state of the guide robot and the state of the user. That is, the combined system of the guide robot and the user is modeled to establish a human-robot kinematic model.

Step 103: generating a collision-free global path based on the position of the obstacle.

In the present embodiment, the collision-free global path can be generated based on the position of the obstacle. The collision-free global path takes an initial position of the guide robot as a starting point and a target position as an end point, and is free of obstacles throughout the path.

Step 104: generating a control command based on the state update equation for the combined system and the collision-free global path.

In the present embodiment, the control command can be generated based on the state update equation for the combined system and the collision-free global path. The control command may include a collision-free local motion control quantity generated based on the state update equation for the combined system and the collision-free global path, and is used for driving the guide robot to move.

Step 105: driving the guide robot to move based on the control command.

In the present embodiment, as for the guide robot, considering that the user will always follow the rigid object end, it may be assumed that a force applied to the guide robot through the rigid object by the user can be fully compensated. Thus, the guide robot movement can be only driven by its own control commands.

The method for controlling a guide robot provided by embodiments of the present disclosure first acquires a state of the guide robot, a state of a user, and a position of an obstacle; then generates a state update equation for a combined system of the guide robot and the user based on the state of the guide robot and the state of the user; then generates a collision-free global path based on the position of the obstacle; then generates a control command based on the state update equation for the combined system and the collision-free global path; and finally drives the guide robot to move based on the control command. The combined system of the guide robot and the user is modeled for perception, path planning, and movement control on the overall human-robot kinematic model, thereby ensuring that both the guide robot and the user can avoid obstacles, and further improving the practicality and reliability of the guide robot.

Figure 2:
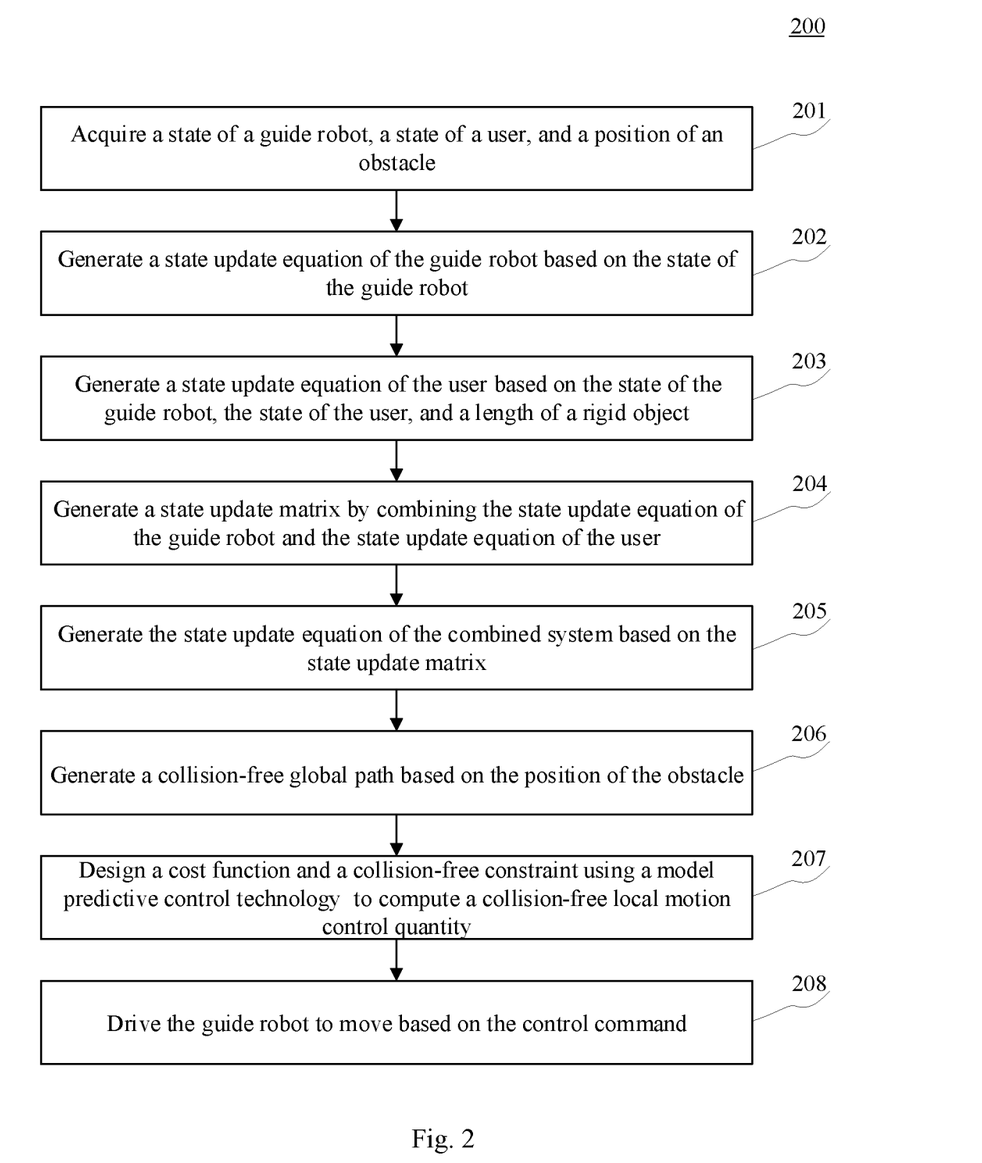
FIG. 2 is a flowchart of the method for controlling a guide robot according to another embodiment of the present disclosure.

Further referring to FIG. 2, a process 200 of another embodiment of the method for controlling a guide robot is shown. The method for controlling a guide robot includes the following steps:

Step 201: acquiring a state of a guide robot, a state of a user, and a position of an obstacle.

In the present embodiment, sensors may be mounted on the guide robot for acquiring the state of the guide robot, the state of the user, and the position of the obstacle.

The state of the guide robot may include a position and a heading angle of the guide robot, and may be expressed as $[x^b, y^b, \theta^b]$, where $(x^b, y^b)$ is the position, and $\theta^b$ is the heading angle. The state of the user may include a position of the user, and may be expressed as $(x^h, y^h)$.

Step 202: generating a state update equation for the guide robot based on the state of the guide robot.

In the present embodiment, since the guide robot is independent of the user, the state update equation for the guide robot can be generated based on the state of the guide robot.

Since the guide robot is independent of the user, a unicycle model is selected to describe the guide robot movement. In this case, a kinematic model of the guide robot is usually described as:

$$\begin{cases} \dot{x}^b = v \cdot \cos\theta^b \\ \dot{y}^b = v \cdot \sin\theta^b \\ \dot{\theta}^b = \omega \end{cases} \quad (1)$$

Where v is a linear velocity, and ω is an angular velocity. In discrete time, equation (1) can be written as:

$$\begin{cases} x^b_{k+1} = x^b_k + \Delta t \cdot \cos\theta^b_k \cdot v_k \\ y^b_{k+1} = y^b_k + \Delta t \cdot \sin\theta^b_k \cdot v_k \\ \theta^b_{k+1} = \theta^b_k + \Delta t \cdot \omega_k \end{cases} \quad (2)$$

Where k represents for an iteration step, and Δt is a period of an update loop.

Step 203: generating a state update equation for the user based on the state of the guide robot, the state of the user, and a length of a rigid object.

In the present embodiment, since the user will follow the rigid object end and keep a constant distance to the guide robot, the state update equation for the user can only be generated based on the state of the guide robot, the state of the user, and the length of the rigid object.

Since both interaction with the guide robot and intention of the user will affect the velocity, user velocity dynamics is difficult to formulate without assuming user speed is equal to the guide robot speed. However, since the user will follow the rigid object end and keep a constant distance to the guide robot, user position at next step can be inferred based on current configuration.

Figure 3:
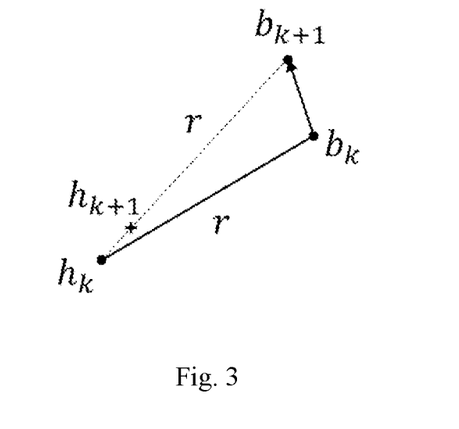
FIG. 3 is a schematic diagram of a process of inferring a position of a user.

As shown in FIG. 3, $h_k$ and $b_k$ are the positions of the user and the guide robot at step k respectively. The length of the rigid object is r, which is fixed when the guide robot moves. At step k+1, the guide robot moves to $b_{k+1}$. The next user position $h_{k+1}$ is assumed to locate on a line connecting $h_k$ and $b_{k+1}$, with a distance of r to the location of $b_{k+1}$. Based on this assumption, the state update equation for the user can be further formulated:

$$\begin{cases} x^h_{k+1} = \frac{r}{d} \cdot x^h_k + \left(1 - \frac{r}{d}\right) \cdot x^b_{k+1} \\ y^h_{k+1} = \frac{r}{d} \cdot y^h_k + \left(1 - \frac{r}{d}\right) \cdot y^b_{k+1} \end{cases} \quad (3)$$

Where $d = \|h_k - b_{k+1}\|$.

Step 204: generating a state update matrix by combining the state update equation for the guide robot and the state update equation for the user.

In the present embodiment, the state update matrix can be generated by combining the state update equation for the guide robot and the state update equation for the user.

By combining equation (2) and equation (3), state update matrices A and B can be obtained:

$$A = \begin{bmatrix} I & 0 & 0 \\ \left(1 - \frac{r}{d}\right) \cdot I & \frac{r}{d} \cdot I & 0 \\ 0 & 0 & 1 \end{bmatrix} \quad (4)$$

$$B = \Delta t \cdot \begin{bmatrix} s^T & 0 \\ \left(1 - \frac{r}{d}\right) \cdot s^T & 0 \\ 0 & 1 \end{bmatrix} \quad (5)$$

Where $I \in i^{2 \times 2}$, and is a unit matrix, while a vector s is defined as $s = [\cos\theta^b \; \sin\theta^b]$.

Step 205: generating the state update equation for the combined system based on the state update matrix.

In the present embodiment, the state update equation for the combined system can be generated based on the state update matrix.

The state update equation for the combined system of the guide robot and the user may be further expressed as:

$$x_{k+1} = Ax_k + Bu_k \quad (6)$$

Where a state vector is $x = [x^b \; y^b \; x^h \; y^h \; \theta^b]^T$, and a control input vector is $u = [v \; \omega]^T$.

The selected state vector contains redundant state vectors. It is possible to use 4 states to describe the system by replacing the user position ($x^h$, $y^h$) with a human-robot body angle since the distance between the user and the guide robot is constant. Such definition of state vector with redundant states brings benefits to the design process of local motion planning. It is more intuitive and convenient to set up collision-free constraints.

Step 206: generating a collision-free global path based on the position of the obstacle.

In the present embodiment, the collision-free global path can be generated based on the position of the obstacle. The collision-free global path takes an initial position of the guide robot as a starting point and a target position as an end point, and is free of obstacles throughout the path.

Step 207: designing a cost function and a collision-free constraint using a model predictive control technology to compute a collision-free local motion control quantity.

In the present embodiment, the local motion planning can be performed using the MPC (Model Predictive Control) technology. The cost function and the collision-free constraint are designed in order to guarantee collision-free as well as fast computation.

Generally, a general MPC problem with obstacle avoidance can be formulated as:

$$\min_{(x,u)} \sum_{k=0}^{N} 1(x_k, u_k) \quad (7)$$

$$\text{s.t.} \begin{cases} x_0 = x_S, x_{N+1} = x_F \\ x_{k+1} = f(x_k, u_k) \\ g(x_k, u_k) \leq 0 \\ E(x_k) \cap O^{(m)} = \emptyset \end{cases}$$

Where N is the prediction horizon, 1 is optimization goal (cost function), $x_S$ is the initial state at start, $x_F$ is the final reference state, f represents for dynamics of the system, g represents for inequality constraints of system states and control inputs, E is a space occupied by a controlled object at time k, and $O^{(m)}$ is a set of obstacles, while m is an index of each obstacle.

In equation (7), the collision-free constraint usually makes the problem difficult to solve because it is commonly non-convex and non-differentiable. In general, there are two directions to handle this problem. The first direction is to formulate this constraint as a differentiable function and use a non-convex optimization solver to solve the problem. Another direction is to construct a sequential convex optimization problem to formulate each iteration as a convex suboptimization problem. This method starts with a guess solution and runs iteratively. The constraint is linearized around the solution from the previous step to form a convex optimization problem.

Here, the idea of sequential convex optimization is employed. The collision-free constraint is linearized at each iteration. The cost function is built to penalize the error of the states and the control effort. Equality constraints are constructed based on the linearized state update equations, while inequality constraints are applied to regulate upper and lower bounds of the states and the control inputs, with consideration of obstacle avoidance. The optimization problem is then formulated as:

$$\min \sum_{k=0}^{N-1} (x_k - x_F)^T Q(x_k - x_F) + \sum_{k=0}^{N-1} u_k^T R u_k \quad (8)$$

$$\text{s.t.} \begin{cases} x_0 = x_s \\ x_{k+1} = A x_k + B u_k \\ x_{min} \le x_k \le x_{max} \\ u_{min} \le u_k \le u_{max} \\ C x_k \le z \end{cases}$$

Where C is a matrix, z is a vector, and the inequality constraint $Cx_k \le z$ depicts a collision-free convex set. In equation (8), the inequality constraints $x_{min} \le x_k \le x_{max}$ and $Cx_k \le z$ are intended to ensure that the generated local trajectory is collision-free.

The constraints are constructed by selecting check points from the guide robot and the user, and ensure that each check point is collision-free. In particular, the human body center position, guide robot center position, and sample points along the rigid object are selected as the check points.

Figure 4:
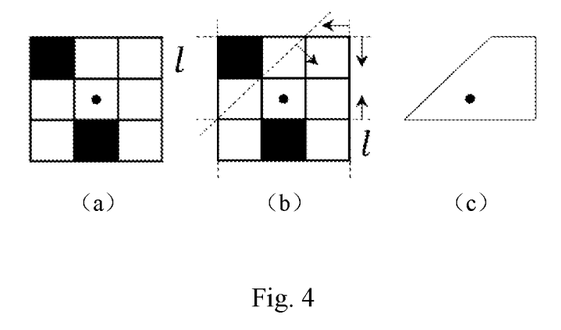
FIG. 4 is a schematic diagram of a process of determining a feasible region.

Given each check point, a local grid map can be built to determine the convex set, which is defined by matrix C, vector z, $x_{min}$ and $x_{max}$. As shown in FIG. 4(a), a resolution as 1 for the grid is selected, and then a local 3×3 grid map with the check point locating at the center is constructed. By traversing 8 surrounding grids, if there exists any obstacle inside a grid, the grid is marked occupied. White grids are unoccupied grids, while black grids are occupied grids. As shown in FIG. 4(b), for each occupied grid, a line is further drawn to connect the check point and the closest point of the occupied grid. Then, a tangent at the closest point can be identified, and a half-plane including the check point is selected as a feasible set. The final convex feasible region is the intersection of all feasible half-planes related to the respective occupied grids. The dotted line is the tangent at the closest point. FIG. 4(c) shows the feasible region.

Given the collision-free global path, a local target state $x_F$ for an MPC local planner is defined in equation (8). It is assumed that a middle position point between the user and the guide robot should follow the collision-free global path, and the local target state is defined as a system reference point.

Considering the collision-free global path is T ($p_0$, $p_1$, ..., $p_n$, ..., $p_{2n}$, ..., $p_{3n}$, ...) where p is a two-dimensional point, and n is a selected positive integer, controlling a look ahead distance. It is assumed that a current reference system position locates at $p_0$, and sets the target position at $p_{2n}$. By applying linear regression with trajectory points from $p_0$ to $p_{2n}$, equilibrium of this part of trajectory can be determined. The equilibrium point is used to linearize the system model. Applying linear regression one more time with trajectory points from $p_n$ to $p_{3n}$, a desired yaw angle $\psi$ of the user and the guide robot system can be computed. Suppose reference system position coordinates are denoted as ($p_x$, $p_y$), a local target state vector can be computed as:

$$x_F = \begin{bmatrix} p_x + \frac{r}{2} \cdot \cos\psi \\ p_y + \frac{r}{2} \cdot \sin\psi \\ p_x + \frac{r}{2} \cdot \cos(\psi + \pi) \\ p_y + \frac{r}{2} \cdot \sin(\psi + \pi) \\ \psi \end{bmatrix} \quad (9)$$

Step 208: driving the guide robot to move based on the control command.

In the present embodiment, for the guide robot, considering that the user will always follow the rigid object end, it is assumed that a force applied to the guide robot through the rigid object by the user can be fully compensated. Therefore, the guide robot movement can be only driven by its own control commands.

As can be seen from FIG. 2, compared with the corresponding embodiment of FIG. 1, the process 200 of the method for controlling a guide robot in the present embodiment highlights the generating a state update equation and the computing a collision-free local motion control quantity. Therefore, in the solution according to the present embodiment, an EKF (Extended Kalman Filter) is applied to output estimation of a state vector with measurement data and system model of the human-robot system. In this way, the human-robot state can be determined robustly. The benefit of this design is that the sensors are mounted on the guide robot, and the user does not have to take extra sensors. At the same time, the local motion planning can be performed using the MPC technology. The cost function and the collision-free constraint are designed in order to guarantee collision-free as well as fast computation.

Figure 5:
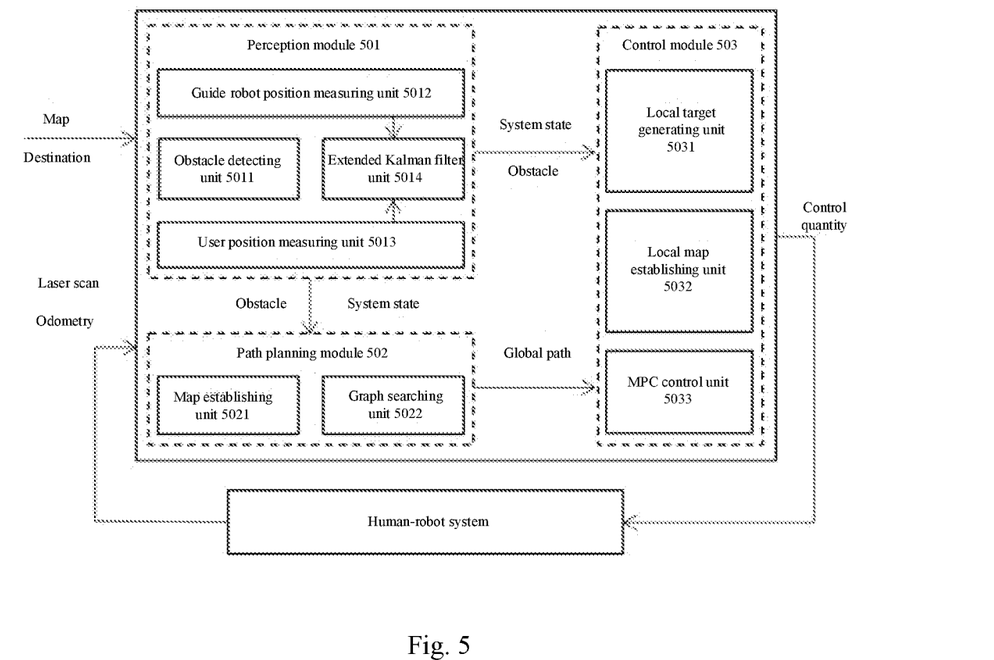
FIG. 5 is a structural block diagram of a human-robot system.

Further referring to FIG. 5, a structural block diagram of a human-robot system is shown. As shown in FIG. 5, the human-robot system includes 3 modules: a perception module 501, a path planning module 502, and a control module 503. The perception module 501 may include an obstacle detecting unit 5011 configured to detect an obstacle, a guide robot position measuring unit 5012 configured to detect a guide robot, a user position measuring unit 5013 configured to detect a user, and an extended Kalman filter unit 5014 configured to estimate a system state on a state of the guide robot and a state of the user using an extended Kalman filter. The perception module 501 takes raw sensor data, including but not limited to wheel odometry, lidar, IMU, and the like, as inputs, and can detect obstacles, the guide robot, and the state of the user. The path planning module 502 may include a map establishing unit 5021 configured to establish a global grid map and a graph searching unit 5022 configured to search a collision-free global path. For the path planning module 502, the inputs include, but are not limited to, a pre-built lidar environment map, the obstacles, the system state, destination information, and the like, and the output is the collision-free global path. The control module 503 may include a local target generating unit 5031 configured to generate a local target state, a local map establishing unit 5032 configured to establish a local grid map, and an MPC control unit 5033 configured to generate a control quantity that drives the guide robot to move. For the control module 503, the inputs include, but are not limited to, the obstacles, the system state, the collision-free global path, and the like, and the output is a collision-free local motion control quantity.

The perception module can perform obstacle detection, guide robot pose measurement, and user position measurement.

Figure 6:
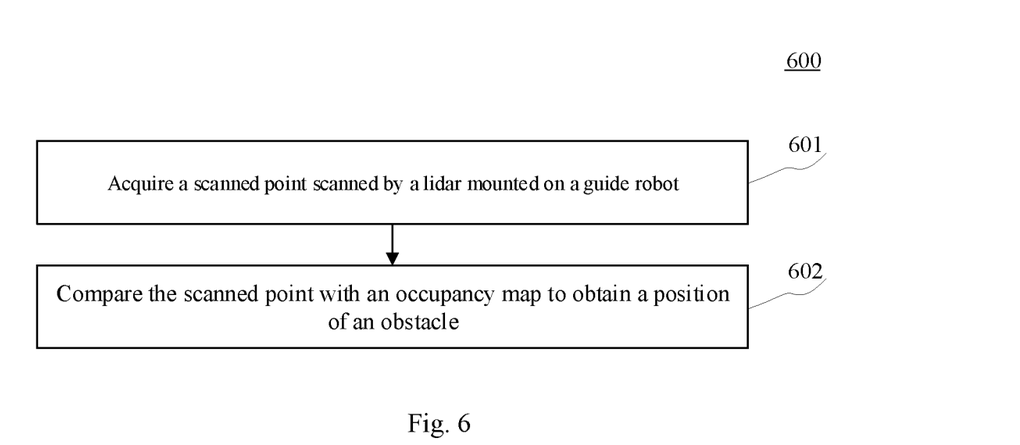
FIG. 6 is a flowchart of a method for detecting an obstacle according to an embodiment of the present disclosure.

For ease of understanding, FIG. 6 shows a process 600 of an embodiment of a method for detecting an obstacle. The method for detecting an obstacle includes the following steps:

Step 601: acquiring a scanned point scanned by a lidar mounted on a guide robot.

Step 602: comparing the scanned point with an occupancy map to obtain a position of an obstacle.

Figure 7:
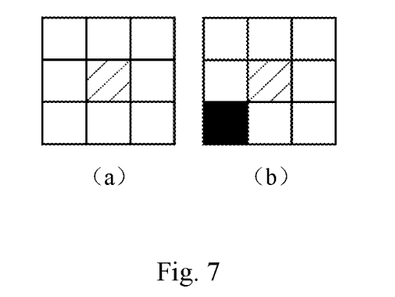
FIG. 7 is a schematic diagram of a process of detecting an obstacle.

In the present embodiment, obstacle detection implementation is based on lidar scanning and occupancy map information. The occupancy map is also referred to as an occupancy grid map. For an ordinary map, a point either has an obstacle or has no obstacle. For the occupancy grid map, a grid corresponds to a point, and is used for denoting a probability that the point is occupied (with an obstacle). A simple method is presented to effectively reduce obstacles detected due to errors caused by guide robot positioning and noisy lidar scanning. Generally, for each scanned point, neighbouring pixels of the scanned point are determined in the occupancy map. If a pixel among the neighbouring pixels is occupied status, then the scanned point is close to an original static obstacle, and is very likely to be on the obstacle. If no pixel among the neighbouring pixels is occupied status, the scanned point is determined to be an obstacle point. In the current implementation, the scanned point is checked with n-ring neighbouring pixels thereof. Generally, n=1, the scanned point is located at the center, and 1-ring neighbouring pixels thereof are checked. As shown in FIG. 7(a), the scanned point is marked as an obstacle point because all 8 neighbouring pixels of the scanned point are "free" status. As shown in FIG. 7(b), considering the errors caused by guide robot positioning and noisy lidar scanning, the scanned point is not used as an obstacle point, because it is close to the bottom left pixel, which is "occupied" status.

Figure 8:
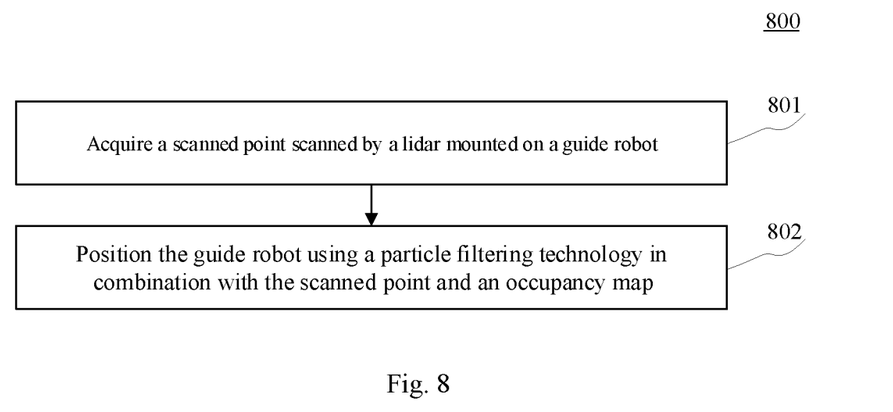
FIG. 8 is a flowchart of a method for positioning a guide robot according to an embodiment of the present disclosure.

For ease of understanding, FIG. 8 shows a process 800 of an embodiment of a method for positioning a guide robot. The method for positioning a guide robot includes the following steps:

Step 801: acquiring a scanned point scanned by a lidar mounted on a guide robot.

Step 802: positioning the guide robot using a particle filtering technology in combination with the scanned point and an occupancy map.

In the present embodiment, the guide robot is positioned using a lidar-based gmapping SLAM technology. First, a working area is scanned for mapping, and the guide robot is positioned using the particle filtering technology in combination with the occupancy map information based on the scanned point of the lidar during working.

The concept of particle filtering is based on Monte Carlo method. It denotes a probability using a particle set, and can be used in any form of state space model. Its core concept is to express its distribution by particles in a random state extracted from a posterior probability, and it is a sequential importance sampling method. Simply speaking, the particle filtering refers to a process of approximating a probability density function by finding a group of random samples propagating in a state space, and replacing an integral operation with a sample mean, thus obtaining minimum variance distribution of states. The samples here refer to particles, and can approach any form of probability density distribution when the number of samples approaches infinity. Although the probability distribution in the algorithm is only an approximation to the true distribution, due to non-parametric characteristics, it breaks away from a constraint that a random quantity must meet Gaussian distribution when solving a nonlinear filtering problem, can express a distribution wider than a Gaussian model, and also has stronger modeling capabilities for nonlinear characteristics of variable parameters. Therefore, the particle filtering can accurately express the posterior probability distribution based on an observed quantity and a control quantity, and can be used to solve SLAM problems.

Figure 9:
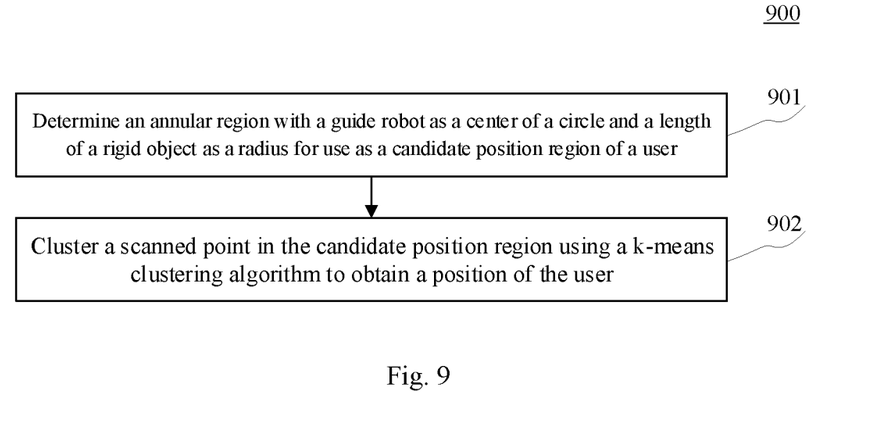
FIG. 9 is a flowchart of a method for positioning a user according to an embodiment of the present disclosure.

For ease of understanding, FIG. 9 shows a process 900 of an embodiment of a method for positioning a user. The method for positioning a user includes the following steps:

Step 901: determining an annular region with a guide robot as a center of a circle and a length of a rigid object as a radius for use as a candidate position region of a user.

Step 902: clustering a scanned point in the candidate position region using a k-means clustering algorithm to obtain a position of the user.

In the present embodiment, the user need not take extra sensors, and only uses the sensors mounted on the guide robot for determining the user position. Since a scanned point of the user should always locate at a collision-free space in a map, the user is identified as an "obstacle" point according to the method for detecting an obstacle presented in FIG. 6. In addition, since the user keeps constant distance r to the guide robot, all obstacle points located at the annular region of the guide robot are first picked up. The width of the annular region is 2dr and the distance of the user to the guide robot is bounded to [r−dr, r+dr]. All qualified points are put into a list L, and the k-means clustering algorithm is used to find the position of the user. After applying k-means clustering, a distance between a previous human position and each human position candidate point will be computed and saved in the list. By sorting the list, a candidate object corresponding to a smallest distance result is selected as a lidar measurement of the position of the user.

The path planning module can be configured to plan a collision-free global path.

Figure 10:
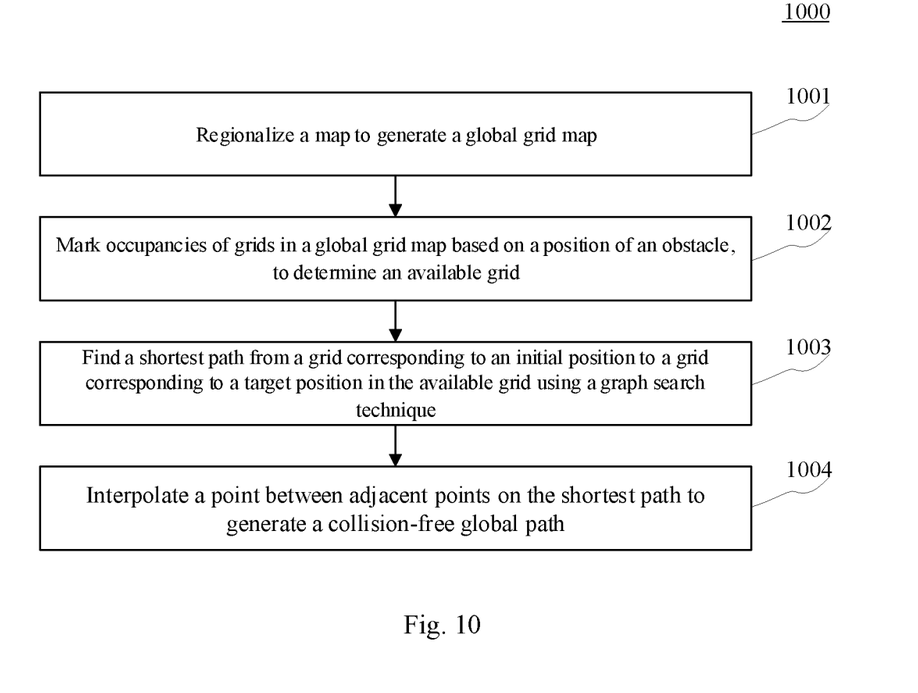
FIG. 10 is a flowchart of a method for planning a path according to an embodiment of the present disclosure.

For ease of understanding, FIG. 10 shows a process 1000 of an embodiment of a method for planning a path. The method for planning a path includes the following steps:

Step 1001: regionalizing a map to generate a global grid map.

Step 1002: marking occupancies of grids in a global grid map based on a position of an obstacle, to determine an available grid.

Step 1003: finding a shortest path from a grid corresponding to an initial position to a grid corresponding to a target position in the available grid using a graph search technique.

Step 1004: interpolating a point between neighbouring points on the shortest path to generate a collision-free global path.

In the present embodiment, the goal for global grid map generation is to construct a graph based on the map. This method is similar to the local grid map generation in FIG. 2. First, the grid length 1 is selected. Then, based on the map size and resolution, an m×n square grid mask is attached to the map. Finally, each grid is examined based on all pixels inside the grid. If any of the pixel is in "occupied" or "unknown" status, then the grid will be marked as "unavailable". If all pixels are in "free" status, the grid will be marked as "available". The global grid map updates with an obstacle detection loop. Detected obstacle points are mapped to corresponding grids. Each obstacle grid is set to "unavailable" status, and is held for a short period to ensure robustness. The benefit to generate the global grid map is that it can speed up graph search to find a feasible global path.

The start position of the collision-free global path can be acquired from localization, and the target position can be given by a user input. The graph search technique is applied to find a shortest path from a start grid to a destination grid among "available" grids. By interpolating the point between neighbouring points on the shortest path, the collision-free global path can be generated, which will be sent to the control module.

Figure 11:
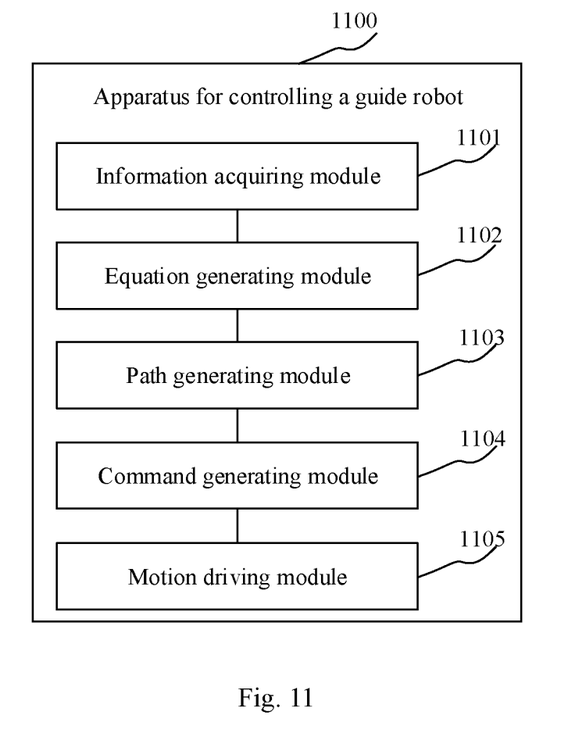
FIG. 11 is a schematic structural diagram of an apparatus for controlling a guide robot according to an embodiment of the present disclosure.

Further referring to FIG. 11, as an implementation of the method shown in the above figures, the present disclosure provides an embodiment of an apparatus for controlling a guide robot. The embodiment of the apparatus corresponds to the embodiment of the method shown in FIG. 2. The apparatus may be specifically applied to various electronic devices.

As shown in FIG. 11, the apparatus 1100 for controlling a guide robot of the present embodiment may include: an information acquiring module 1101, an equation generating module 1102, a path generating module 1103, a command generating module 1104, and a movement driving module 1105. The information acquiring module 1101 is configured to acquire a state of the guide robot, a state of a user, and a position of an obstacle, the guide robot and the user being connected with a rigid object; the equation generating module 1102 is configured to generate a state update equation for a combined system of the guide robot and the user based on the state of the guide robot and the state of the user; the path generating module 1103 is configured to generate a collision-free global path based on the position of the obstacle; the command generating module 1104 is configured to generate a control command based on the state update equation for the combined system and the collision-free global path; and the movement driving module 1105 is configured to drive the guide robot to move based on the control command.

The related description of steps 101-105 in the corresponding embodiment of FIG. 1 may be referred to for specific processing of the information acquiring module 1101, the equation generating module 1102, the path generating module 1103, the command generating module 1104, and the movement driving module 1105 of the apparatus 1100 for controlling a guide robot in the present embodiment and the technical effects thereof, respectively. The description will not be repeated here.

In some alternative implementations of the present embodiment, the information acquiring module 1101 includes: an acquiring submodule (not shown in the figure) configured to acquire a scanned point scanned by a lidar mounted on the guide robot; and a positioning submodule (not shown in the figure) configured to position the guide robot using a particle filtering technology in combination with the scanned point and an occupancy map.

In some alternative implementations of the present embodiment, the information acquiring module 1101 includes: a determining submodule (not shown in the figure) configured to determine an annular region with the guide robot as a center of a circle and a length of a rigid rod as a radius for use as a candidate position region of the user; and a clustering submodule (not shown in the figure) configured to cluster a scanned point in the candidate position region using a k-means clustering algorithm to obtain a position of the user.

In some alternative implementations of the present embodiment, the information acquiring module 1101 includes: an acquiring submodule (not shown in the figure) configured to acquire a scanned point scanned by a lidar mounted on the guide robot; and a comparing submodule (not shown in the figure) configured to compare the scanned point with an occupancy map to obtain the position of the obstacle.

In some alternative implementations of the present embodiment, the comparing submodule is further configured to: determine neighbouring pixels of the scanned point in the occupancy map; determine, in response to a pixel among the neighbouring pixels being occupied status, that the scanned point is not an obstacle point; and determine, in response to no pixel among the neighbouring pixels being occupied status, that the scanned point is the obstacle point.

In some alternative implementations of the present embodiment, the equation generating module 1102 is further configured to: generate a state update equation for the guide robot based on the state of the guide robot; generate a state update equation for the user based on the state of the guide robot, the state of the user, and the length of the rigid rod; generate a state update matrix by combining the state update equation for the guide robot and the state update equation for the user; and generate the state update equation for the combined system based on the state update matrix.

In some alternative implementations of the present embodiment, the path generating module 1103 is further configured to: regionalize a map to generate a global grid map; mark occupancies of grids in the global grid map based on the position of the obstacle, to determine an available grid; find a shortest path from a grid corresponding to an initial position to a grid corresponding to a target position in the available grid using a graph search technique; interpolate a point between neighbouring points on the shortest path to generate the collision-free global path.

In some alternative implementations of the present embodiment, the command generating module 1104 includes: a computing submodule (not shown in the figure) configured to design a cost function and a collision-free constraint using a model predictive control technology to compute a collision-free local motion control quantity, where the cost function is used for penalizing errors of states and control effects, and the collision-free constraint is linearized using sequential convex optimization at each iteration.

In some alternative implementations of the present embodiment, the computing submodule is further configured to: select a check point from the guide robot and the user; establish a local grid map centered on the check point; mark occupancies of grids in the local grid map based on the position of the obstacle, to determine a feasible region of the check point; determine a local target state based on the collision-free global path; and generate the collision-free local motion control quantity based on the feasible region and the local target state.

According to an embodiment of the present disclosure, the present disclosure further provides an electronic device and a readable storage medium.

Figure 12:
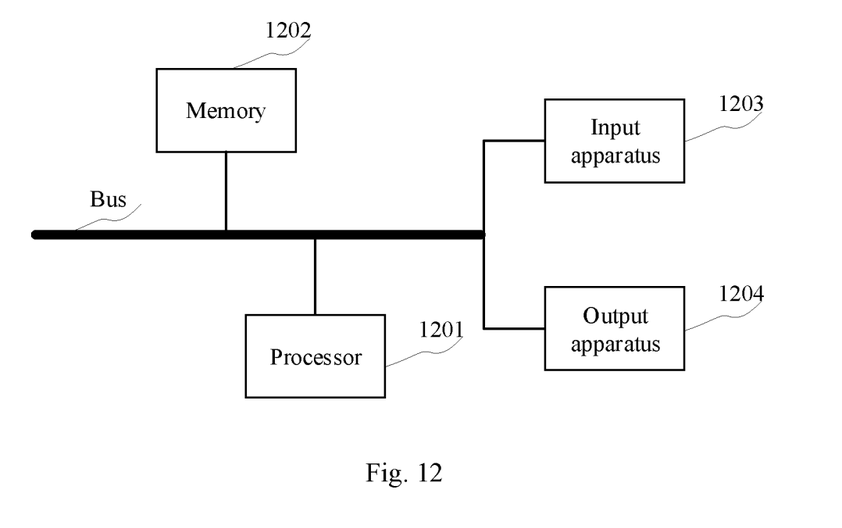
FIG. 12 is a block diagram of an electronic device for implementing the method for controlling a guide robot of embodiments of the present disclosure.

FIG. 12 is a block diagram of an electronic device of the method for controlling a guide robot according to embodiments of the present disclosure. The electronic device is intended to represent various forms of digital computers, such as a laptop computer, a desktop computer, a workbench, a personal digital assistant, a server, a blade server, a mainframe computer, and other suitable computers. The electronic device may also represent various forms of mobile apparatuses, such as a personal digital assistant, a cell phone, a smart phone, a wearable device, and other similar computing apparatuses. The components shown herein, the connections and relationships thereof, and the functions thereof are used as examples only, and are not intended to limit implementations of the present disclosure described and/or claimed herein.

As shown in FIG. 12, the electronic device includes: one or more processors 1201, a memory 1202, and interfaces for connecting various components, including a high-speed interface and a low-speed interface. The various components are interconnected using different buses, and may be mounted on a common motherboard or in other manners as required. The processor can process instructions for execution within the electronic device, including instructions stored in the memory or on the memory to display graphical information for a GUI on an external input/output apparatus (e.g., a display device coupled to an interface). In other embodiments, a plurality of processors and/or a plurality of buses may be used, as appropriate, along with a plurality of memories and a plurality of memories. Similarly, a plurality of electronic devices may be connected, with each device providing portions of necessary operations (e.g., as a server array, a group of blade servers, or a multi-processor system). In FIG. 12, a processor 1201 is taken as an example.

The memory 1202 is a non-transient computer-readable storage medium provided by the present disclosure. The memory stores instructions that can be executed by at least one processor, such that the at least one processor executes the method for controlling a guide robot provided by the present disclosure. The non-transient computer-readable storage medium of the present disclosure stores computer instructions. The computer instructions are used for causing a computer to execute the method for controlling a guide robot provided by the present disclosure.

As a non-transient computer-readable storage medium, the memory 1202 may be configured to store non-transient software programs, non-transient computer-executable programs and modules, such as program instructions/modules (e.g., the information acquiring module 1101, the equation generating module 1102, the path generating module 1103, the command generating module 1104, and the movement driving module 1105 shown in FIG. 11) corresponding to the method for controlling a guide robot in the embodiments of the present disclosure. The processor 1201 runs non-transient software programs, instructions, and modules stored in the memory 1202, so as to execute various function applications and data processing of a server, i.e., implementing the method for controlling a guide robot in the above embodiments of the method.

The memory 1202 may include a program storage area and a data storage area, where the program storage area may store an operating system and an application program required by at least one function; and the data storage area may store, e.g., data created based on use of the electronic device of the method for controlling a guide robot. In addition, the memory 1202 may include a high-speed random access memory, and may further include a non-transient memory, such as at least one magnetic disk storage component, a flash memory component, or other non-transient solid-state storage components. In some embodiments, the memory 1202 alternatively includes memories configured remotely relative to the processor 1201, and these remote memories may be connected to the electronic device of the method for controlling a guide robot via a network. Examples of the above network include, but are not limited to, the Internet, an intranet, a local area network, a mobile communication network, and a combination thereof.

The electronic device of the method for controlling a guide robot may further include: an input apparatus 1203 and an output apparatus 1204. The processor 1201, the memory 1202, the input apparatus 1203, and the output apparatus 1204 may be connected through a bus or in other manners. Bus connection is taken as an example in FIG. 12.

The input apparatus 1203 can receive inputted number or character information, and generate a key signal input related to user settings and function control of the electronic device of the method for controlling a guide, e.g., an input apparatus such as a touch screen, a keypad, a mouse, a trackpad, a touchpad, an indicating arm, one or more mouse buttons, a trackball, and a joystick. The output apparatus 1204 may include a display device, an auxiliary lighting apparatus (e.g., an LED), a haptic feedback apparatus (e.g., a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in a digital electronic circuit system, an integrated circuit system, an ASIC (application specific integrated circuit), computer hardware, firmware, software, and/or a combination thereof. The various embodiments may include: implementation in one or more computer programs that are executable and/or interpretable on a programmable system including at least one programmable processor, which may be a special purpose or general purpose programmable processor, and may receive data and instructions from, and transmit data and instructions to, a storage system, at least one input apparatus, and at least one output apparatus.

These computing programs (also known as programs, software, software applications, or codes) include machine instructions for a programmable processor, and may be implemented in a high-level procedural and/or object-oriented programming language, and/or in an assembly/machine language. As used herein, the terms "machine-readable medium" and "computer-readable medium" refer to any computer program product, device, and/or apparatus (e.g., a magnetic disk, an optical disk, a memory, or a programmable logic device (PLD)) configured to provide machine instructions and/or data to a programmable processor, and include a machine-readable medium receiving machine instructions as machine-readable signals. The term "machine-readable signal" refers to any signal used to provide machine instructions and/or data to a programmable processor.

To provide interaction with a user, the systems and technologies described herein can be implemented on a computer that is provided with: a display apparatus (e.g., a CRT (cathode ray tube) or a LCD (liquid crystal display) monitor) for displaying information to the user); and a keyboard and a pointing apparatus (e.g., a mouse or a trackball) by which the user can provide an input to the computer. Other kinds of apparatus may also be used to provide interaction with the user. For example, the feedback provided to the user may be any form of sensory feedback (e.g., visual feedback, auditory feedback, or haptic feedback); and may receive an input from the user in any form (including an acoustic input, a voice input, or a tactile input).

The systems and technologies described herein may be implemented in a computing system that includes a back-end component (for example, as a data server), or a computing system that includes a middleware component (for example, an application server), or a computing system that includes a front-end component (for example, a user computer with a graphical user interface or a web browser through which the user can interact with an implementation of the systems and technologies described herein), or a computing system that includes any combination of such a back-end component, such a middleware component, or such a front-end component. The components of the system can be interconnected by any form or medium of digital data communication (e.g., a communication network). Examples of the communication network include: a local area network (LAN), a wide area network (WAN), and the Internet.

The computer system may include a client terminal and a server. The client terminal and the server are generally remote from each other, and usually interact through a communication network. The relationship of the client terminal and the server is generated by computer programs that run on corresponding computers and have a client-server relationship with each other.

The technical solutions according to the present disclosure first acquire a state of a guide robot, a state of a user, and a position of an obstacle; then generate a state update equation for a combined system of the guide robot and the user based on the state of the guide robot and the state of the user; then generate a collision-free global path based on the position of the obstacle; then generate a control command based on the state update equation for the combined system and the collision-free global path; and finally drive the guide robot to move based on the control command. The combined system of the guide robot and the user is modeled for perception, path planning, and movement control on the overall human-robot kinematic model, thereby ensuring that both the guide robot and the user can avoid obstacles, and further improving the practicality and reliability of the guide robot.

As another aspect, an embodiment of the present disclosure provides another server, including: an interface; a memory storing one or more programs thereon; and one or more processors operably connected to the interface and the memory for: acquiring a state of a guide robot, a state of a user, and a position of an obstacle, the guide robot and the user being connected with a rigid object; generating a state update equation for a combined system of the guide robot and the user based on the state of the guide robot and the state of the user; generating a collision-free global path based on the position of the obstacle; generating a control command based on the state update equation for the combined system and the collision-free global path; and driving the guide robot to move based on the control command.

As still another aspect, an embodiment of the present disclosure provides a computer-readable storage medium storing a computer program thereon, where the computer program, when executed by one or more processors, causes the one or more processors to: acquire a state of a guide robot, a state of a user, and a position of an obstacle, the guide robot and the user being connected with a rigid object; generate a state update equation for a combined system of the guide robot and the user based on the state of the guide robot and the state of the user; generate a collision-free global path based on the position of the obstacle; generate a control command based on the state update equation for the combined system and the collision-free global path; and drive the guide robot to move based on the control command.

It should be understood that the various forms of processes shown above can be used to reorder, add, or delete steps. For example, the steps described in the present disclosure can be executed in parallel, sequentially, or in different orders, as long as the desired results of the technical solutions disclosed in the present disclosure can be achieved. This is not limited herein.

The above specific embodiments do not constitute a limitation to the protection scope of the present disclosure. It should be understood by those skilled in the art that various modifications, combinations, sub-combinations, and substitutions may be made according to the design requirements and other factors. Any modification, equivalent replacement, improvement, and the like made within the spirit and principle of the present disclosure should be included within the protection scope of the present disclosure.

What is claimed is:

1. A method for controlling a guide robot, comprising:
   acquiring a state of the guide robot, a state of a user, and a position of an obstacle, the guide robot and the user being connected with a rigid object;
   generating a state update equation for a combined system of the guide robot and the user based on the state of the guide robot and the state of the user;
   generating a collision-free global path based on the position of the obstacle;
   generating a control command based on the state update equation for the combined system and the collision-free global path; and
   driving the guide robot to move based on the control command,
   wherein the acquiring a state of a user comprises:
      determining an annular region with the guide robot as a center of a circle and the length of the rigid object as a radius for use as a candidate position region of the user; and
      clustering a scanned point in the candidate position region using a k-means clustering algorithm to obtain a position of the user.

2. The method according to claim 1, wherein the generating a state update equation for a combined system of the guide robot and the user based on the state of the guide robot and the state of the user comprises:
   generating a state update equation for the guide robot based on the state of the guide robot;
   generating a state update equation for the user based on the state of the guide robot, the state of the user, and a length of the rigid object;
   generating a state update matrix by combining the state update equation for the guide robot and the state update equation for the user; and
   generating the state update equation for the combined system based on the state update matrix.

3. The method according to claim 2, wherein the generating a collision-free global path based on the position of the obstacle comprises:
   regionalizing a map to generate a global grid map;
   marking occupancies of grids in the global grid map based on the position of the obstacle, to determine an available grid;

finding a shortest path from a grid corresponding to an initial position to a grid corresponding to a target position in the available grid using a graph search technique; and
interpolating a point between neighbouring points on the shortest path to generate the collision-free global path.

4. The method according to claim 2, wherein the generating a control command based on the state update equation for the combined system and the collision-free global path comprises:
designing a cost function and a collision-free constraint using a model predictive control technology to compute a collision-free local motion control quantity, wherein the cost function is used for penalizing errors of states and control effects, and the collision-free constraint is linearized using sequential convex optimization at each iteration.

5. The method according to claim 2, wherein the acquiring a state of the guide robot comprises:
acquiring a scanned point scanned by a lidar mounted on the guide robot; and
positioning the guide robot using a particle filtering technology in combination with the scanned point and an occupancy map.

6. The method according to claim 2, wherein the acquiring a position of an obstacle comprises:
acquiring a scanned point scanned by a lidar mounted on the guide robot; and
comparing the scanned point with an occupancy map to obtain the position of the obstacle.

7. The method according to claim 1, wherein the generating a collision-free global path based on the position of the obstacle comprises:
regionalizing a map to generate a global grid map;
marking occupancies of grids in the global grid map based on the position of the obstacle, to determine an available grid;
finding a shortest path from a grid corresponding to an initial position to a grid corresponding to a target position in the available grid using a graph search technique; and
interpolating a point between neighbouring points on the shortest path to generate the collision-free global path.

8. The method according to claim 1, wherein the generating a control command based on the state update equation for the combined system and the collision-free global path comprises:
designing a cost function and a collision-free constraint using a model predictive control technology to compute a collision-free local motion control quantity, wherein the cost function is used for penalizing errors of states and control effects, and the collision-free constraint is linearized using sequential convex optimization at each iteration.

9. The method according to claim 8, wherein the designing a cost function and a collision-free constraint using a model predictive control technology to compute a collision-free local motion control quantity comprises:
selecting a check point from the guide robot and the user;
establishing a local grid map centered on the check point;
marking occupancies of grids in the local grid map based on the position of the obstacle, to determine a feasible region of the check point;
determining a local target state based on the collision-free global path; and
generating the collision-free local motion control quantity based on the feasible region and the local target state.

10. The method according to claim 1, wherein the acquiring a state of the guide robot comprises:
acquiring a scanned point scanned by a lidar mounted on the guide robot; and
positioning the guide robot using a particle filtering technology in combination with the scanned point and an occupancy map.

11. The method according to claim 1, wherein the acquiring a position of an obstacle comprises:
acquiring a scanned point scanned by a lidar mounted on the guide robot; and
comparing the scanned point with an occupancy map to obtain the position of the obstacle.

12. The method according to claim 11, wherein the comparing the scanned point with the occupancy map to obtain the position of the obstacle comprises:
determining neighbouring pixels of the scanned point in the occupancy map;
determining, in response to a pixel among the neighbouring pixels being occupied status, that the scanned point is not an obstacle point; and
determining, in response to no pixel among the neighbouring pixels being occupied status, that the scanned point is the obstacle point.

13. An electronic device, comprising:
one or more processors; and
a storage apparatus, storing one or more programs thereon,
the one or more programs, when executed by the one or more processors, causing the one or more processors to:
acquire a state of a guide robot, a state of a user, and a position of an obstacle, the guide robot and the user being connected with a rigid object;
generate a state update equation for a combined system of the guide robot and the user based on the state of the guide robot and the state of the user;
generate a collision-free global path based on the position of the obstacle;
generate a control command based on the state update equation for the combined system and the collision-free global path; and
drive the guide robot to move based on the control command,
wherein the state of the user is acquired by:
determining an annular region with the guide robot as a center of a circle and the length of the rigid object as a radius for use as a candidate position region of the user; and
clustering a scanned point in the candidate position region using a k-means clustering algorithm to obtain a position of the user.

14. The electronic device according to claim 13, wherein to generate a state update equation for a combined system of the guide robot and the user based on the state of the guide robot and the state of the user comprises:
generating a state update equation for the guide robot based on the state of the guide robot;
generating a state update equation for the user based on the state of the guide robot, the state of the user, and a length of the rigid object;
generating a state update matrix by combining the state update equation for the guide robot and the state update equation for the user; and
generating the state update equation for the combined system based on the state update matrix.

15. The electronic device according to claim 13, wherein to generate a collision-free global path based on the position of the obstacle comprises:

regionalizing a map to generate a global grid map;

marking occupancies of grids in the global grid map based on the position of the obstacle, to determine an available grid;

finding a shortest path from a grid corresponding to an initial position to a grid corresponding to a target position in the available grid using a graph search technique; and interpolating a point between neighbouring points on the shortest path to generate the collision-free global path.

16. The electronic device according to claim 13, wherein to generate a control command based on the state update equation for the combined system and the collision-free global path comprises:

designing a cost function and a collision-free constraint using a model predictive control technology to compute a collision-free local motion control quantity, wherein the cost function is used for penalizing errors of states and control effects, and the collision-free constraint is linearized using sequential convex optimization at each iteration.

17. The electronic device according to claim 16, wherein the designing a cost function and a collision-free constraint using a model predictive control technology to compute a collision-free local motion control quantity comprises:

selecting a check point from the guide robot and the user;

establishing a local grid map centered on the check point;

marking occupancies of grids in the local grid map based on the position of the obstacle, to determine a feasible region of the check point;

determining a local target state based on the collision-free global path; and generating the collision-free local motion control quantity based on the feasible region and the local target state.

18. A non-transitory computer-readable medium, storing a computer program thereon, wherein the computer program, when executed by a processor, to:

acquire a state of the guide robot, a state of a user, and a position of an obstacle, the guide robot and the user being connected with a rigid object;

generate a state update equation for a combined system of the guide robot and the user based on the state of the guide robot and the state of the user;

generate a collision-free global path based on the position of the obstacle;

generate a control command based on the state update equation for the combined system and the collision-free global path; and drive the guide robot to move based on the control command, wherein the state of the user is acquired by:

determining an annular region with the guide robot as a center of a circle and the length of the rigid object as a radius for use as a candidate position region of the user; and clustering a scanned point in the candidate position region using a k-means clustering algorithm to obtain a position of the user.

* * * * *